March 14, 1944.     E. H. SMITH     2,344,219
CUTTING TORCH
Filed Oct. 10, 1940     2 Sheets-Sheet 2
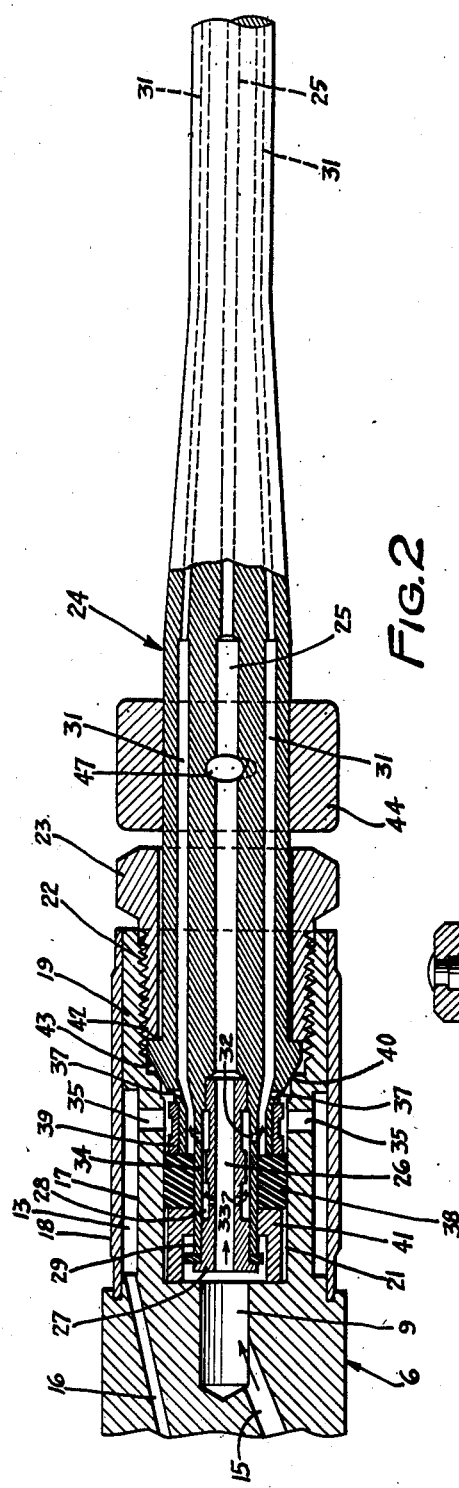
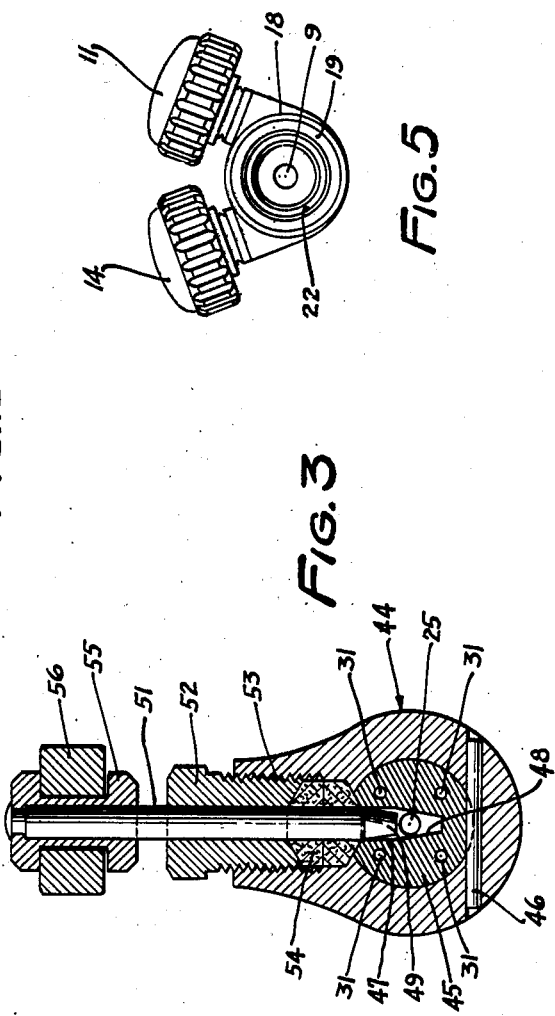
INVENTOR
ELMER H. SMITH
By Paul, Paul & Moore
ATTORNEYS Patented Mar. 14, 1944

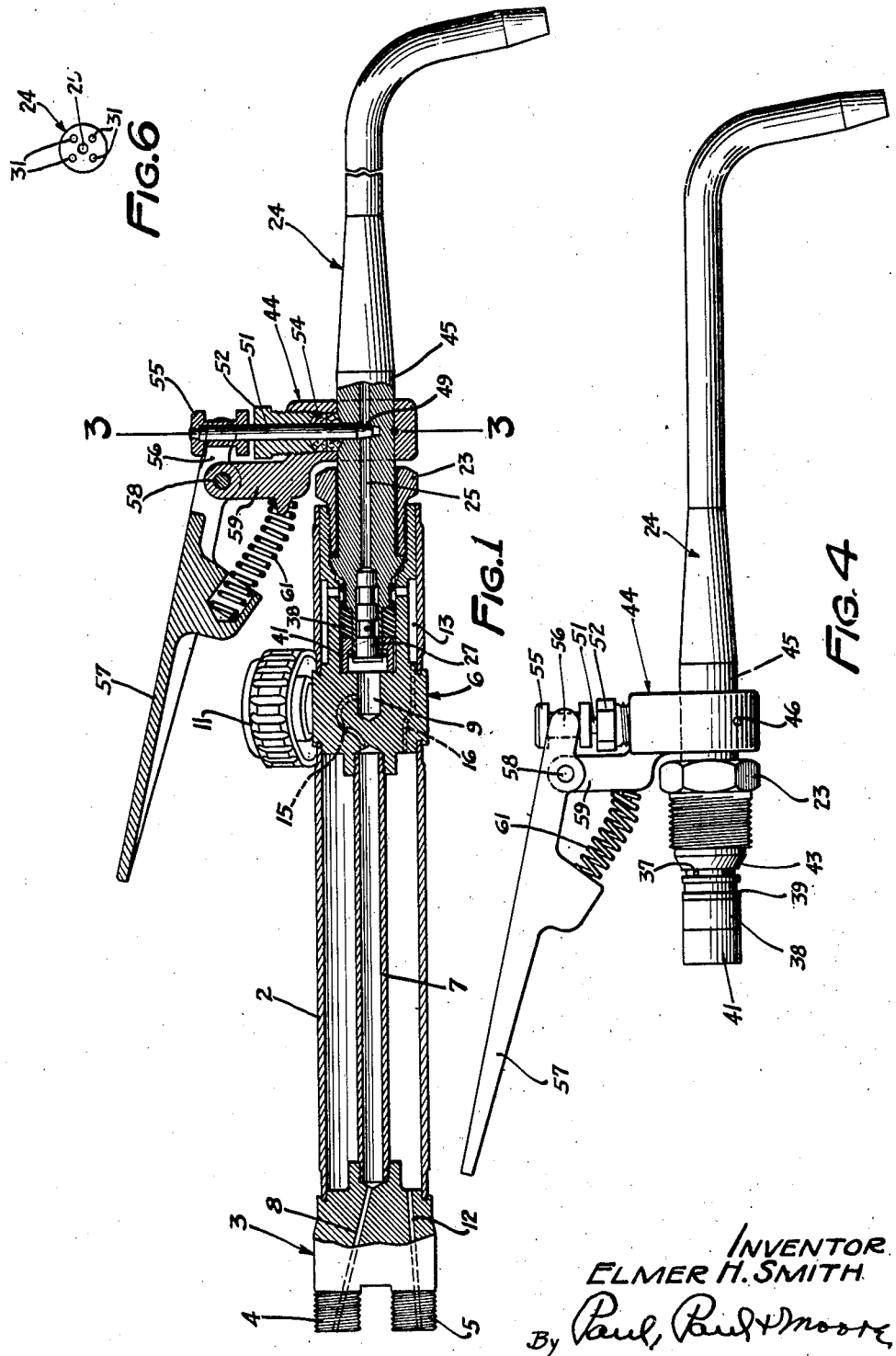

2,344,219

UNITED STATES PATENT OFFICE 2,344,219

CUTTING TORCH

Elmer H. Smith, Minneapolis, Minn., assignor to Smith Welding Equipment Corporation, Minneapolis, Minn., a corporation of Minnesota Application October 10, 1940, Serial No. 360,639

1 Claim. (Cl. 158—27.4)

This invention relates to new and useful improvements in cutting torches and more particularly to such a torch comprising novel means for controlling the flow of cutting gas or oxygen from the tip to the work.

Cutting torches, as now commonly constructed, usually comprise a handle having a butt at one end to which the corresponding ends of the usual cutting oxygen tube and preheater tubes are secured. The opposite ends of said tubes are usually connected to a torch head which is adapted to receive said tubes and carries a torch tip. The oxygen and acetylene gases are supplied to the butt piece of the handle from suitable supplies of oxygen and acetylene, and such supplies are controlled by suitable valves carried by the handle. A suitable cutting lever is usually mounted on the butt piece for controlling the flow of cutting oxygen through the tip to the work, after the work has been properly preheated.

Torches such as above described, are more or less expensive because of the torch tip being supported in a head which is secured to the outer ends of the cutting oxygen and preheater tubes. Such torches are sometimes found impractical for operating on certain types of work as, for example, the insides of pipes or flues, or other restricted areas where the conventional torch head and tip cannot readily be inserted.

The novel tip structure herein disclosed has numerous advantages over conventional devices of this type, in that it is less expensive to manufacture; is lighter in weight; and is of such size and shape that it may readily be inserted into restricted places where a conventional torch head cannot be inserted.

An object of the invention therefore is to provide a torch assembly which is extremely simple and inexpensive in construction, is well balanced, and which may readily be used as a cutting or a welding torch by simply interchanging the tips in the torch head, each tip being provided with its own control valve.

A further object is to provide an improved torch of the class described, comprising a handle having a torch tip detachably and adjustably secured to one end thereof, and said tip being provided with independent means for controlling the flow of gas therefrom to the work.

A further object is to provide a torch assembly comprising a handle portion having a head at one end and a butt piece at its opposite end, and a cutting torch being detachably supported in said head and carrying a valve whereby the flow of cutting oxygen from the central orifice of the tip may readily be controlled by the simple manipulation of a small lever carried by the valve means on the tip.

Other objects of the invention reside in the novel construction of the tip, which has a valve supported directly thereon for controlling the flow of cutting gas therefrom; in the unique manner of detachably securing the tip body to the handle, whereby the tip may readily be rotatively adjusted to any desired angle without interfering with the operation of the cutting oxygen valve or the valves for controlling the delivery of oxygen and fuel gas to the torch head; and, in the provision of a torch which may readily be converted from a cutting to a welding torch and vice versa by simply substituting a welding tip for the cutting tip or a cutting tip for the welding tip, each such tip carrying its own control valve, which valves are independent of the control valves carried by the torch handle.

Other objects of the invention will appear from the following description and accompanying drawings and will be pointed out in the annexed claim.

In the accompanying drawings there has been disclosed a structure designed to carry out the various objects of the invention, but it is to be understood that the invention is not confined to the exact features shown as various changes may be made within the scope of the claims which follow.

In the drawings:

Figure 1 is a longitudinal sectional view showing a torch assembly embodying the invention;

Figure 2 is an enlarged detail sectional view showing the connection between the body of the torch tip and the head of the torch handle;

Figure 3 is an enlarged cross-sectional view on the line 3—3 of Figure 1;

Figure 4 is a view showing the tip and its control valve removed from the torch handle;

Figure 5 is an end view of the handle with the tip removed, showing the means for controlling the supplies of oxygen and acetylene to the torch tip: and Figure 6 is a view showing the arrangement of the fuel gas orifices and the cutting gas orifice at the terminal of the tip.

In the selected embodiment of the invention herein shown, there is illustrated in Figure 1, for purposes of disclosure, a torch comprising the usual tubular handle 2 having a butt piece 3 secured to one end thereof provided with threaded nipples 4 and 5 for connecting the handle to suitable supplies of oxygen and acetylene, respectively, as is well known.

A suitable head 6 is secured to the opposite end of the handle 2, and is shown having a tube 7 connecting it to the butt piece 3. A duct 8 in the butt piece 3 conducts the oxygen from the nipple 4 to the tube 7. The opposite end of the tube 7 is connected to the chamber 9 through a suitable control valve, indicated by the numeral 11 in Figures 1 and 5.

A duct 12 connects the nipple 5 to the interior of the handle 2, and the opposite end of the handle is connected to an annular chamber 13 through a suitable control valve, indicated by the numeral 14 in Figures 1 and 5. The specific construction of the valves 11 and 14 is not shown in detail in the drawings, as such valves are well-known to the trade.

In Figure 1, there is indicated in dotted lines, a passage 15 for connecting the interior of the tube 7 with the chamber 9, and a passage 16 for connecting the interior of the handle 2 to the chamber 13. It is to be understood that these passages are diagrammatically shown only, as the valves 11 and 14 are interposed therein, and control the flow of gas therethrough to the chambers 9 and 13.

The head 6 is shown having a reduced cylindrical portion 17 which cooperates with a tubular member 18 to provide the annular chamber 13, hereinbefore referred to. The cylindrical portion 17 terminates at its outer end in an enlargement 19, which fits the bore of the tubular member 18 in such a manner as to provide a leak-proof joint therebetween.

The reduced portion 17 has an axial bore 21, one end of which communicates with the chamber 9 and its opposite end terminating in a threaded socket 22. A suitable clamping nut 23 is received in the socket 22 for securing the torch tip, generally designated by the numeral 24, in position in the torch head 6, as clearly illustrated in Figures 1 and 2.

An important feature of the present invention resides in the novel construction of the torch tip 24 and the means for controlling the flow of cutting gas therethrough. The tip 24, as best shown in Figure 2, is provided with a central or axially disposed passage 25 through which a suitable cutting gas, such as pure oxygen, may flow to the end of the tip to be projected against the work. The inner end of the passage 25 communicates with a passage 26 provided in an equalizer plug, generally designated by the numeral 27. The equalizer plug is received in a bore 28 provided in the inner reduced end portion 29 of the torch tip. The passage 26 in the equalizer plug 27 establishes communication between the passage 25 of the tip and the chamber 9 of the torch head 6.

A plurality of fuel gas passages 31 are provided in the torch tip and are preferably spaced equidistant apart around the central cutting gas passage 25, as best shown in Figures 3 and 6. The passages 31 extend outwardly to the end of the tip in the usual manner, as clearly illustrated in Figure 6. In the torch tip herein disclosed, the fuel gas flowing through the passages 31 may be composed of a mixture of acetylene and oxygen, and means is therefore provided for delivering these gases to the passages 31 in the proper proportions to provide a combustible fuel gas mixture. Oxygen is delivered to the fuel gas passages 31 through a plurality of small ducts 32 and 33 and an annular restricted passage 34, which establish communication between the passages 31 and the passage 26 in the equalizer plug. The restricted passage 34 serves to equalize the pressure of the fuel gas delivered to the passages 31, whereby the flame jets projected from the end of the tip, when the torch is used for preheating the work, will be substantially uniform in length. It will also be understood, as hereinbefore stated, that the supply of oxygen to the passage 26 of the equalizer plug 27, is controlled by the valve 11, shown in Figures 1 and 5.

The supply of acetylene to the fuel gas passages 31 is received from the passage 16 through the chamber 13 and a plurality of radial ducts 35, which communicate with an annular restricted passage 36 which, in turn, is connected to the fuel gas passages 31 through a plurality of small radial ducts 37. The control valve 14, shown in Figure 5, controls the flow of acetylene through the passage 16 to the fuel gas passages 31, as hereinbefore stated.

A suitable compression member 38 is shown mounted on the reduced cylindrical portion 29 of the tip, and is adapted to be compressed between a member 39 carried by the tip at the right hand side of the sealing member 38, as shown in Figure 2, and a seat expander 41, mounted on the cylindrical end portion 29 of the tip. When the clamping nut 23 is tightened, the sealing element 38 will be compressed between the members 39 and 41, because of the inner end of the clamping nut 23 engaging a shoulder 42 on the tip body, whereby a leak-proof connection is provided between the sealing element and bore 21 of the torch head. The tip preferably has a tapered face 43 adapted to engage a seat 40 to prevent gas leakage from the tip around the clamping nut 23.

Another important feature of the invention resides in the means provided for controlling the flow of oxygen through the central passage 25 of the cutting tip 24. As best shown in Figures 1 and 4, the means for controlling the flow of oxygen through the tip is carried directly upon the tip, and is shown comprising a valve body, generally designated by the numeral 44. The valve body is bored to receive the cylindrical body portion 45 of the tip, and is immovably secured thereto by such means as a pin 46, received in an aperture provided in the valve body and which passes through a portion of the tip body 45, as clearly illustrated in Figure 3. Other means may be provided, if desired, for securing the valve body 44 to the tip.

The enlarged body portion 45 of the tip is shown provided with a transverse cylindrical bore 47, which traverses the central passage 25 of the tip and has its lower end tapered to provide, in effect, a tapered seat 48, adapted to be engaged by the tapered end portion 49 of a suitable valve stem 51.

The lower end of the valve stem 51 is guided in the cylindrical bore 47, and its upper portion in a suitable packing nut or gland 52, received in a threaded socket 53 provided in the upper portion of the valve body 44. A suitable packing 54 is provided between the lower end of the packing nut 52 and the bottom of the socket 53 for preventing leakage around the valve stem 51.

A valve stem lifter 55 is suitably secured to the upper end of the valve stem 51, and is adapted to be engaged by the forked end 56 of a suitable operating lever 57. The lever 57 may be mounted on a pivot 58 supported in a lug or bracket 59, shown provided on one end of the valve body 44. A suitable spring 61 is shown interposed between the lug 59 and the lever 57, and normally urges the lever in a direction to move the lower end of the valve stem into closing engagement with the seat 48. The tapered seat 48 is so arranged with respect to the central oxygen passage 25 of the torch tip, that when the lower end of the valve stem is moved into engagement therewith, flow through the oxygen passage 25 may be completely cut off.

By mounting the oxygen control valve 44 directly on the cutting tip, as shown in Figures 1 and 4, the entire torch assembly is considerably lightened in weight, as the cutting oxygen and preheater tubes, usually provided between the butt piece at the forward end of the handle and the torch head, are dispensed with and, in lieu thereof, the single elongated torch tip 24 is used as shown in Figures 1 and 4. Various lengths of tips may be provided to adapt the torch for various kinds of work, said tips being interchangeably supported in the head 6 by the single clamping nut 23. It will also be noted by reference to Figure 4, that each tip carries its own oxygen control valve, which valve is extremely simple and inexpensive in construction, and provides a very convenient and efficient control for the flow of pure oxygen from the central passage 25 of the tip.

By constructing a tip as shown in Figures 1 and 4, the torch may quickly be converted from a cutting to a welding torch, by simply substituting a welding tip for the cutting tip, shown in Figure 4. By supporting the tip in the torch head in the manner shown, the position of the valve handle 57 with respect to the control valves 11 and 14 may readily be varied as desired by simply rotating the tip in the head by releasing the clamping nut 23.

The novel torch herein disclosed, may readily and conveniently be operated with a relatively long tip because of the elimination of the usual head provided at the cutting end of a conventional torch for supporting a relatively short tip. Also, by constructing the tip as herein disclosed, the weight is so distributed that a very well balanced torch assembly is provided, even though the tip 24 may be relatively long, which is highly desirable as such a well balanced torch may be operated with much less effort. The bend at the end of the tip obviously may be varied to suit the type of work to be operated upon.

In the operation of the torch, the work is preheated by the usual preheating flames or jets projected from the fuel gas passages at the end of the tip around the central oxygen passage 25. When oxygen and acetylene are used as a fuel gas, the mixture of such gases is controlled by manipulation of the valves 11 and 14 in the usual manner. The flow of pure oxygen from the central cutting orifice is controlled entirely by manipulation of the lever 57, the central passage 25 being in direct communication with the oxygen supply tube 7, as hereinbefore described. It will thus be noted that the operation of the novel torch herein disclosed is substantially identical to the operation of conventional torches.

I claim as my invention:

In a torch of the class described, a handle having a head at one end provided with a socket, a cutting tip having one end detachably and adjustably supported in said socket, means for supplying cutting oxygen to said socket and tip, said tip comprising a cylindrical body portion and an elongated slender end portion, said body and end portions having a longitudinally extending central cutting oxygen passage therein communicating with the oxygen supply to the socket, and a valve for controlling the flow of oxygen from the tip, said valve comprising a body portion having a bore therein for receiving the cylindrical portion of the torch tip body and whereby the valve body is secured directly to the body portion of the tip, whereby it is removable with the tip.

ELMER H. SMITH.